United States Patent [19]

Harris et al.

[11] Patent Number: 4,686,274
[45] Date of Patent: Aug. 11, 1987

[54] PROCESS FOR PREPARING MODIFIED POLY(ALKYLENE CARBONATE) POLYAHLS

[75] Inventors: Robert F. Harris, Midland, Mich.; Donald G. Prier, Baton Rouge, La.

[73] Assignee: The Dow Chemical Company, Midland, Mich.

[21] Appl. No.: 809,675

[22] Filed: Dec. 16, 1985

[51] Int. Cl.$^4$ .............................................. C08G 63/62
[52] U.S. Cl. ..................................... 528/196; 525/462; 525/466; 525/467; 525/469; 528/271; 528/272; 528/309.1; 528/354; 528/370; 528/371; 528/405; 528/421; 528/262; 528/266; 558/268
[58] Field of Search ............... 525/462, 466, 467, 468, 525/469; 528/370, 371, 405, 421, 262, 266, 268, 196, 271, 272, 309

[56] References Cited

U.S. PATENT DOCUMENTS

| | | | |
|---|---|---|---|
| 1,922,459 | 8/1933 | Schmidt et al. | 260/106 |
| 2,871,219 | 1/1959 | Baggett et al. | 260/45.95 |
| 2,891,073 | 6/1959 | Smith | 260/340.2 |
| 3,058,921 | 10/1962 | Pannell | 260/2 |
| 3,128,311 | 4/1964 | Shirley et al. | 260/585 |
| 3,133,113 | 5/1964 | Malkemus | 260/463 |
| 3,152,998 | 10/1964 | Moss | 252/170 |
| 3,248,414 | 4/1966 | Stevens | 260/463 |
| 3,248,415 | 4/1966 | Stevens | 260/463 |
| 3,248,416 | 4/1966 | Stevens | 260/463 |
| 3,313,782 | 4/1967 | Springmann et al. | 260/77.5 |
| 3,347,926 | 10/1967 | Zech | 260/585 |
| 3,379,693 | 4/1968 | Hostetler et al. | 260/77.5 |
| 3,654,370 | 4/1972 | Yeskey | 260/584 B |
| 3,689,462 | 4/1972 | Maximovich | 260/77.5 D |
| 3,896,090 | 7/1975 | Maximovich | 260/77.5 D |
| 4,014,933 | 3/1977 | Boettger et al. | 260/563 R |
| 4,105,641 | 8/1978 | Buysch et al. | 526/712 |
| 4,131,731 | 12/1978 | Lai et al. | 528/370 |
| 4,153,581 | 5/1979 | Habermann | 252/472 |
| 4,191,705 | 3/1980 | Lindner et al. | 260/463 |
| 4,431,754 | 2/1984 | Hoffmann | 521/137 |
| 4,460,715 | 7/1984 | Hoffmann et al. | 521/137 |
| 4,465,713 | 8/1984 | Lock et al. | 427/385.5 |
| 4,476,293 | 10/1984 | Robinson | 528/76 |

OTHER PUBLICATIONS

Kirk-Othmer, Encyclopedia of Chemical Technology, vol. 18, 3rd Ed., pp. 624-625, 638-640, published by Interscience Publishers, Inc.
Journal of American Chemical Society, vol. 49, 3181 (1927).

Primary Examiner—Theodore E. Pertilla

[57] ABSTRACT

A process for modifying a poly(alkylene carbonate) polyahl, which comprises reacting the poly(alkylene carbonate) polyahl, with at least one modifier having at least one active hydrogen moiety or cyclic anhydride, optionally in the presence of a catalyst under transesterification conditions to form a modified poly(alkylene carbonate) polyahl wherein the modifier is chemically bonded to the backbone of the poly(alkylene carbonate) polyahl.

37 Claims, No Drawings

PROCESS FOR PREPARING MODIFIED POLY(ALKYLENE CARBONATE) POLYAHLS

FIELD OF THE INVENTION

This invention relates to a method of modifying poly(alkylene carbonate)polyahls.

BACKGROUND OF THE INVENTION

Poly(alkylene carbonate)polyahls are randomized polymers containing alkylene carbonate moieties and optionally ether moieties such as di- and higher polyalkylenoxy units. Poly(alkylene carbonate)polyahls are useful in preparing polyurethanes, and as adhesives and surfactants.

Polyether polyols and polyester polyols are well-known polymers which can be further polymerized with organic polyisocyanates to prepare polyurethanes. Polyether polyols are prepared by the reaction of hydroxy-containing hydrocarbons, such as an aromatic or aliphatic diol, and epoxides, for instance ethylene oxide and propylene oxide. Polyester polyols are prepared by the reaction of polyacids, such as adipic or terephthalic acid, or esters of polyacids, such as dimethyl adipate or dimethyl terephthalate with dihydroxy-containing hydrocarbons, such as aromatic and aliphatic diols. Some poly(alkylene carbonate)polyol properties resemble polyester polyol properties, while other properties resemble polyether polyols.

It is known to prepare polycarbonates from aliphatic dihydroxyl compounds either by a process of phosgenation in which hydrogen chloride is liberated or bound by bases, such as pyridine or quinoline, or by a process of transesterification with carbonic acid esters of alcohols or phenols, preferably diphenylcarbonate, optionally with the aid of transesterification catalysts. In either cases, it is essential to use phosgene or a mixture of carbon monoxide and chlorine as source of carbonic acid. Commercial processes which involve the preparation and handling of phosgene are difficult and costly because of the considerable safety risks involved and the high cost of materials due to corrosion. To this are added ecological problems, since either the spent air is contaminated with hydrogen chloride or the effluent water with sodium chloride.

Polycarbonates produced by these methods, using dihydrocarbyl compounds, may have a functionality of less than two due to inadequate or incomplete esterification or transesterification, which often prevents the products from forming high molecular weight polymers in subsequent reactions.

Stevens (in U.S. Pat. Nos. 3,248,414; 3,248,415; and 3,248,416) discloses the preparation of poly(alkylene carbonate)polyols from (1) carbon dioxide and 1,2-epoxides; (2) cyclic carbonates such as ethylene carbonate; or (3) cyclic carbonates and a 1,2-epoxide. A minor amount of a polyol is employed as an initiator. The reaction is usually conducted under pressure in the presence of a metal carbonate, metal hydroxide, trisodium phosphate, or tertiary amine.

Poly(alkylene carbonate)polyols have also been prepared by polymerization of ethylene carbonates using basic catalysts and a minor amount of glycol as initiator, Buysch et al. (U.S. Pat. No. 4,105,641). These products are low in carbonate and high in ether groups concentration due to decomposition of the ethylene carbonate. In Steven's patents discussed hereinbefore, the patentees exposed a poly(alkylene carbonate)polyol derived from ethylene carbonate and monoethylene glycol to temperatures of 160° C. at 2 mm Hg pressure to remove unreacted ethylene carbonate. Hostetler (U.S. Pat. No. 3,379,693) removed unreacted ethylene carbonate from products similar to poly(alkylene carbonate)polyols by heating them to about 130° C. under 1-5 mm Hg. Maximovich (U.S. Pat. No. 3,896,090) reacted ethylene carbonate with diethylene glycol and treated the reaction product under reduced pressure to remove the unreacted ethylene carbonate and diethylene glycol.

Several workers have prepared poly(alkylene carbonate)polyols and related materials by controlling an equilibrium between the reaction materials of a diol and alkylene carbonate and the products of a poly(alkylene carbonate)polyol and monoethylene glycol. The reaction is controlled by the removal of monoethylene glycol.

Malkemus (U.S. Pat. No. 3,133,113) reacted ethylene carbonate and diethylene glycol at 125° C. to 130° C. under reduced pressure of 10 mm Hg with concurrent removal of monoethylene glycol as distillate. This was followed by removal of starting material. This process requires large excesses of ethylene carbonate. This procedure is plagued by the presence of volatile ethylene carbonate, which condenses as a solid throughout the system, causing severe plugging and reducing ethylene carbonate conversion while monoethylene glycol is being removed.

Springmann et al. (U.S. Pat. No. 3,313,782) further studied this process under reduced pressure in the presence of catalysts and set limits on the reaction conditions; the reaction temperatures must be lower than the boiling point of the alkylene carbonate, but high enough to distill off the monoethylene glycol formed.

Lai et al. (U.S. Pat. No. 4,131,731) used staged reductions in pressure during the reaction of alkylene carbonate with a diol, wherein the final stage was to remove monoethylene glycol. The patentees characterized their reaction conditions by stating that the alkylene carbonate must have a boiling point 4.9° C. greater than monoethylene glycol. The chemistry based on the above equilibrium was improved by Buysch et al. (U.S. Pat. No. 4,105,641) by carrying out the reactions in a solvent (e.g., cumene) capable of removing monoethylene glycol as an azeotrope with the solvent.

Until recently, the molecular weights of poly(alkylene carbonate)polyols from alkylene carbonates have been controlled by either the stoichiometry of the reactants (that is, higher alkylene carbonate to initiator ratios for higher molecular weights) or the removal of monoethylene glycol from the reaction mixture wherein an ethylene carbonate to initiator equivalent ratio of about 1 is used. Catalysts are used in most cases, as reaction rates are very slow in the absence of a catalyst. When high alkylene carbonate to initiator ratios are used to make higher molecular weight poly(alkylene carbonate)polyols, reaction rates drop severely as higher conversions are approached: long reaction times are required and the products are contaminated by unreacted alkylene carbonate. If temperatures are increased to increase the rate, product decomposition occurs with $CO_2$ loss. However, in the process of copending application Ser. No. 750,362, filed July 1, 1985 and incorporated herein by reference, rates of molecular weight build up are rapid without $CO_2$ loss. Prior to copending application Ser. No. 750,362, the choice of the ratio of starting reactants and catalysts resulted in an upper limit on the molecular weight of the poly(alkylene carbonate)polyol which could be prepared. Furthermore, the products of such processes are of relatively low molecular weight and have a board molecular weight range; that is, they have a high polydispersity index and are often contaminated with unreacted starting materials and relatively low molecular weight reaction intermediates. Furthermore, the particular reactant ratio and catalyst used have a significant effect on the amount of alkylene carbonate moieties in the backbone of the chain.

A process for preparing higher molecular weight poly(alkylene carbonate)polyols beyond the limitations imposed by the stoichiometry and catalyst used at reasonable reaction rates and free of low molecular weight contaminants is disclosed in copending application Ser. No. 750,362, filed July 1, 1985. What is needed is a process for modifying poly(alkylene carbonate)polyahls by the incorporation of other materials chemically bound into the polymer backbone. The introduction of a modifier allows adjustment of the physical and chemical properties of the poly(alkylene carbonate)polyahl prepared by the present process to maximize its effectiveness in specific applications. Modifiers can be materials such as polyahls which can react with the carbonate moieties of poly(alkylene carbonate)polyahls or they can be materials such as polyacids, or cyclic anhydrides which can react with the active hydrogen moieties (ahl) of poly(alkylene carbonate)polyahls. Some modifiers could be reactive toward both moieties.

As defined, for example, in U.S. Pat. No. 4,431,754 a polyahl is any polyfunctional compound having more than one active hydrogen moiety.

SUMMARY OF THE INVENTION

The invention is a process for modifying a poly(alkylene carbonate)polyahl which comprises contacting the poly(alkylene carbonate)polyahl with at least one modifier having a plurality of moieties that are reactive (such as active hydrogen and/or cyclic anhydride hereinafter collectively called reactive moieties) with the carbonate and/or active hydrogen moieties (hereinafter collectively called active moieties) of the poly(alkylene carbonate)polyahl, optionally in the presence of a catalyst under conditions such that the poly(alkylene carbonate)polyahl backbone or side chain is modified by reaction with the modifier.

In the process of the present invention, poly(alkylene carbonate)polyahls prepared by known processes, may be modified by the incorporation of a polyfunctional material which can react with the carbonate and/or the active hydrogen moieties of the poly(alkylene carbonate)polyahls. This process allows the preparation of modified poly(alkylene carbonate)polyahls at fast rates and high purity. This process allows the preparation of a variety of novel products.

Furthermore, the process of the present invention permits the preparation of poly(alkylene carbonate)polyahls with varying molecular weights or structures. The introduction of a modifier allows adjustment of the physical and chemical properties of the poly(alkylene carbonate)polyahl prepared by the present process to maximize its effectiveness in specific applications. For example, the present process would be useful for producing materials for applications in flexible urethane foams, urethane coatings, rigid urethane foams, urethane/urea elastomers and plastics, adhesives, functional fluids, polymeric coatings and surfactants among others. Moreover, polymers made using the modified poly(alkylene carbonates) of this invention exhibit much improved hydrolytic stability.

DETAILED DESCRIPTION OF THE INVENTION

The starting materials in the process of this invention are poly(alkylene carbonate)polyahls, and polyfunctional materials reactive with poly(alkylene carbonate)polyahls as defined hereinafter.

Poly(alkylene carbonate)polyahls are randomized polymers having a plurality of carbonate moieties and a plurality of active hydrogen moieties and optionally other moieties such as di- and higher polyalkyleneoxy units. An alkylene carbonate moiety is a repeating unit which has an alkylene group bound to a carbonate moiety. As defined herein, an active hydrogen moiety is a moiety containing a hydrogen atom which because of its position in the moiety displays significant activity according to the Zerewitnoff test described by Kohler in the *Journal of American Chemical Society*, Vol. 49, 3181 (1927). Illustrative of such active hydrogen moieties are —COOH, —OH, —NH$_2$, —NH—, —CONH$_2$, —SH and —CONH—. Alkyleneoxy moiety refers herein to a repeating unit which has an alkylene group bound to an oxygen. Alkylene carbonate and alkyleneoxy moieties are respectively represented by the following formulae:

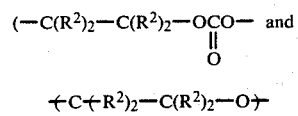

wherein R$^2$ is as hereinafter defined.

Preferred poly(alkylene carbonate)polyahls are random polyols represented by the formula:

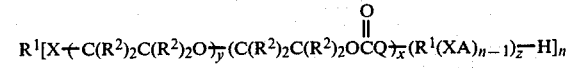

wherein

R$^1$ is separately in each occurrence an n-valent hydrocarbon radical or hydrocarbon radical which can contain one or more heteroatoms of O, N or S;

R$^2$ is separately in each occurrence hydrogen, halogen, a nitro goup, a cyano group, a C$_{1-20}$ hydrocarbyl group or a C$_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH,

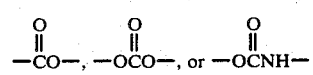

A is separately in each occurrence

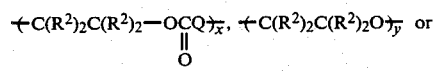

combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class of poly(alkylene carbonate)polyahls are poly(alkylene carbonate)polyols generally corresponding to the aforementioned formula wherein $R^1$, $R^2$, and n are as previously defined; X is oxygen; x is separately in each occurrence an integer of from 2 to 10; y is separately in each occurrence an integer of from 5 to 15 and z is an integer of from 0 to 2; provided that the ratio of y to x is from 1:1 to 3:1.

In the hereinbefore-defined formulas, $R^1$ is preferably an aliphatic or cycloaliphatic hydrocarbon containing one or more oxygen, nitrogen or sulfur moieties; $R^1$ is more preferably an n valent alkane or cycloalkane, or an n valent alkane or cycloalkane containing one or more oxygen, nitrogen or sulfur moieties; $R^1$ is even more preferably an n valent $C_{1-10}$ alkane or an n valent $C_{1-10}$ alkane substituted with one or more oxygen moieties. $R^2$ is preferably hydrogen, $C_{1-20}$ alkyl, $C_{1-20}$ haloalkyl, $C_{1-20}$ alkenyl or phenyl; $R^2$ is more preferably hydrogen, $C_{1-3}$ alkyl, $C_{2-3}$ alkenyl, or phenyl; $R^2$ is even more preferably hydrogen, methyl or ethyl; $R^2$ is even more preferably hydrogen or methyl, and, most preferably, hydrogen. X is preferably S, O or NH; X is most preferably O. Preferably, n is an integer of 1 to 10, inclusive; more preferably, 1 to 5, inclusive; and, most preferably, 1 or 2.

As used herein, the term "polyahl" includes any polyfunctional compound having on average more than 1 active hydrogen moiety as defined hereinbefore. Specifically included within the definition of polyahl are polyols, polyamines, polyamides, polymercaptans and polyacids. Examples of polyahls suitable for use in the instant invention may be found in U.S. Pat. No. 4,465,713 at column 2, line 42 through column 5, line 17.

Poly(alkylene carbonate)polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with an organic compound containing one or more active hydrogen atoms (initiator) in the presence of an alkaline catalyst or metal salt of an alkaline compound. Examples of these poly(alkylene carbonate)polyols and methods for preparation of these polyols are contained in Maximovich (U.S. Pat. No. 3,896,090), Maximovich (U.S. Pat. No. 3,689,462), Springmann (U.S. Pat. No. 3,313,782), Stevens (U.S. Pat. No. 3,248,416), Stevens (U.S. Pat. No. 3,248,415), and Stevens (U.S. Pat. No. 3,248,414) and copending application Ser. No. 750,362 all incorporated herein by reference. Alternatively, the poly(alkylene carbonate)polyols can be prepared by reacting a dialkyl carbonate or diaryl with an initiator with two or more hydroxyl moieties. See, for example, U.S. Pat. No. 4,476,293 and U.S. Pat. No. 4,191,705, incorporated herein by reference. Most preferred are high molecular weight poly(alkylene carbonate)polyahls which are prepared by heating a lower molecular weight poly(alkylene carbonate)polyahl under conditions of reduced pressure and simultaneously removing lower alkylene glycols as disclosed in copending U.S. application Ser. No. 799,211 filed Nov. 18, 1985 or prepared as described in copending U.S. application Ser. No. 750,362.

The poly(alkylene carbonate)polyahls used as starting materials may also contain the residue of an initiator as well as unreacted starting materials.

The organic compounds which function suitably as modifiers in the practice of this invention are polyfunctional materials which are reactive with the carbonate and/or active hydrogen moieties of poly(alkylene carbonate)polyahls. The modifier can also be a different poly(alkylene carbonate)polyahl.

Most polyahls are reactive with the carbonate moieties of poly(alkylene carbonate)polyahls. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, amines including aromatic, aliphatic and heterocyclic amines including polyamines as well as mixtures thereof. Alkylene oxide adducts of compounds which contain two or more different groups within the above-defined classes may also be used such as amino alcohols which contains an amino group and a hydroxyl group. Also alkylene adducts of compounds which contain one —SH group and one —OH group, as well as those which contain an amino group and a —SH group, may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol,-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known gas bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859 and *Encyclopedia of Chemical Technology*, Vol. 18, 3rd Ed., pp. 624–5 and 638–40, published by Interscience Publishers, Inc. (1951), or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, ethylene glycol, propylene glycol, butylene glycol, and blends thereof having hydroxyl equivalent weights of from about 100 to about 5000.

Examples of preferred hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, -hydromuconic acid, -hydromuconic acid, -butyl- -ethylglutaric acid, -diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, diethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, -methyl glucoside, pentaerythritol and sorbitol. Also included with the term "polyhydric alcohol" are compounds derived from phenols such as 2,2-(4,4'-hydroxyphenyl)propane, commonly known as bisphenol A, bis(4,4'-hydroxyphenyl)sulfide and bis(4,4-hydroxylphenyl)sulfone.

Amines which are optionally reacted with alkylene oxides and other oxiranes form amine-initiated polyols which are suitable modifiers include aromatic amines such as aniline, o-chloroaniline, p-amino aniline, 1-5,-diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

A variety of amines can function as the modifier. Any polyfunctional amino compound can be used. A preferred class of polyamines are those prepared by the reductive amination of polyols. Examples of such polyamines can be found in U.S. Pat. Nos. 3,128,311; 3,152,998; 3,347,926; 3,654,370; 4,014,933 and 4,153,581.

Polyahls containing two or more functional groups are also operative modifiers in this process. These include amino acids such as 6-amino caproic acid, 12-amino-dodecanoic acid, p-aminophenylacetic acid, 11-amino-undecanoic acid, 5-aminovaleic acid and the like. Also included are amino alcohols, mercapto alcohols, hydroxy acids, mercapto acids and the like.

Some polyahls suitable as modifiers are also reactive with the active hydrogen moieties of poly(alkylene carbonate)polyahls. Poly acids such as aromatic and aliphatic polycarboxylic acids and polysulfonic and sulfinic acids are in this class of compounds. Polymers and copolymers containing acid-functional moieties are also operable. Other polyahls suitable as modifiers are described in U.S. Pat. No. 4,460,715.

The modifier can also be materials other than polyahls which are reactive with the active hydrogen moieties of poly(alkylene carbonate)polyahls. The cyclic anhydrides are one class of such materials. Examples include succinic anhydride, maleic anhydride, phthalic anhydride, bromomaleic anhydride, dichloromaleic anhydride, dimethylmaleic anhydride, dimethylsuccinic anhydride, 2-dodecen-1-yl succinic anhydride, glutaric anhydride, heptanoic anhydride, hexanoic anhydride, homophthalic anhydride, 3-methylglutaric anhydride, methylsuccinic anhydride, 2-phenylglutaric anhydride, pyromellitic dianhydride and the like. Cyclic anhydrides can contain other functional groups which are reactive with poly(alkylene carbonate)polyahls such as hydroxyl and carboxylic acid groups.

Other modifiers useful in the practice of the present invention include mono-, di-, and trihydroxy compounds. Example of these compounds include water, dihydroxy alcohols such as ethylene glycol, propylene glycol, 1,4-butanediol, 1,6-hexanediol and trihydroxy alcohols such as 1,2,3-propanetriol.

Catalysts optionally used in the preparation of modified poly(alkylene carbonate)polyahls include alkali metal hydroxides, alkaline earth metal hydroxides, alkali metal carbonates, alkaline earth metal carbonates, ammonium hydroxide, and ammonium carbonate.

Preferred catalysts for the modification of the poly(alkylene carbonate)polyahl are metal hydroxides such as lithium, sodium, potassium, rubidium, cesium, magnesium, calcium, strontium, barium, zinc, aluminum, titanium, cobalt, germanium, tin, lead, antimony, arsenic and cerium, as well as the alkoxides thereof. Examples of other preferred catalysts are alkali metal carbonates, alkaline earth metal carbonates, ammonium carbonates, alkali metal borates, alkaline earth metal borates, ammonium borates, hydrocarbyloxy titanates, zinc borate, lead borate, zinc oxide, lead silicate, lead arsenate, litharge, lead carbonate, antimony trioxide, germanium dioxide, cerium trioxide, and aluminum isopropoxide. Examples of other preferred catalysts include salts of organic acids of magnesium, calcium, cerium, barium, zinc and titanium, alkali metal stannates, alkaline metal stannates, and ammonium stannates.

Examples of borate catalysts include sodium meta-borate, sodium meta-borate tetrahydrate, sodium meta-borate dihydrate, sodium pentaborate pentahydrate, sodium tetraborate decahydrate, sodium tetraborate pentahydrate, diammonium tetraborate tetrahydrate, ammonium hydrogen tetraborate tetrahydrate, lithium ortho-dihydroborate, lithium meta-borate, lithium tetraborate, lithium pentaborate pentahydrate, potassium meta-borate, potassium tetraborate tetrahydrate, potassium tetraborate pentahydrate, potassium pentaborate tetrahydrate, magnesium meta-borate trihydrate, magnesium diborate, magnesium ortho-borate, calcium meta-borate, calcium tetraborate, and strontium tetraborate tetrahydrate. Examples of stannate catalysts include sodium stannate trihydrate, potassium stannate trihydrate, potassium stannate monohydrate, barium stannate trihydrate, magnesium stannate trihydrate, and the like.

More preferred catalysts are the alkali metal carbonates, alkaline earth metal carbonates, ammonium carbonates, alkali metal stannates, alkaline earth metal stannates, alkali metal borates, alkaline earth metal borates, and ammonium borates. Even more preferred catalysts are alkali metal carbonates, alkali metal borates, and alkali metal stannates. Most preferred catalysts are potassium carbonate, sodium meta-borate, and sodium stannate.

A suitable amount of the catalyst is an amount which is catalytic under the reaction conditions. Preferable catalysts concentrations are between about 0.01 and 5 percent by weight based upon the reactants; more preferably, between about 0.01 to 1 percent by weight; and, most preferably, 0.05 to 0.1 percent by weight.

The process of the present invention preferably involves (1) contacting a poly(alkylene carbonate)polyahl with another polyahl different from the poly(alkylene carbonate)polyahl optionally in the presence of a catalytic amount of a catalyst for the reaction of a carbonate moiety with an active hydrogen moeity and under reaction conditions causing the modification of the poly(alkylene carbonate)polyahl. It is understood that combinations, i.e., mixtures, of two or more modifiers can be employed with one or a mixture of two or more poly(alkylene carbonate)polyahls in the process of this invention. The amount of modifier employed is an amount which provides the desired modified product weight of the poly(alkylene carbonate)polyahl.

In the preferred embodiment of the invention, a relatively high molecular weight poly(alkylene carbonate)polyahl and a lower molecular weight modifier are contacted under reaction conditions as described hereinafter to produce a product of intermediate molecular weight.

The process of the present invention takes place at any temperature at which the transesterification reaction occurs without appreciable polyahl decomposition. The lower temperature limit is that temperature at which transesterification occurs, and the upper limit is that temperature at which the poly(alkylene carbonate)polyahl, the modifier, or modified poly(alkylene carbonate)polyahl undergoes appreciable decomposition or the modifier is volatilized from the reaction mixture. Preferred temperatures are between about 80° C. and 300° C. More preferred temperatures are between about 135° C. and 260° C., with between about 135° C. and 200° C. being most preferred.

The reaction time for the process of the present invention is variable depending on various factors, including temperature, catalyst, and the compatibility of the modifier with the poly(alkylene carbonate)polyahl. The process is run for a time sufficient to give the desired molecular weight. Reaction times are relatively rapid: only a few minutes to a few hours are required in most cases.

The process of the present invention is generally practiced by contacting a poly(alkylene carbonate)polyahl in neat form, and a modifier, i.e. a polyahl or a cyclic anhydride, optionally in the presence of a catalyst, under transesterification conditions to form a modified poly(alkylene carbonate)polyahl wherein the modifier is chemically bonded to the backbone of the poly(alkylene carbonate)polyahl. The process can be performed in a solvent, although performing the process in neat form (i.e. without a solvent) is preferred. Solvents useful in the practice of the present invention include inert organic solvents which are more volatile than the product.

The products of the process of the present invention are modified poly(alkylene carbonate)polyahls. The molecular weights of the modified poly(alkylene carbonate)polyahls prepared by the present process can be any molecular weight desired which is controlled by the stoichiometry and molecular weights of the starting materials. Preferable molecular weights ($\overline{M}_n$) are between about 300 and 10,000, with most preferred molecular weights being between 500 and 5,000.

SPECIFIC EMBODIMENTS

The following examples are included for illustrative purposes only, and are not intended to limit the scope of the invention or the claims. Unless otherwise stated, all parts and percentages are by weight.

The molecular weights and distribution are determined by size exclusion chromatography (SEC) on Waters Ultrastyragel ® 1000 A and 10,000 A columns in series using tetrahydrofuran (THF) as the mobile phase and calibrated with narrow molecular weight poly(ethylene glycol) standards. In measuring molecular weight by the end group hydroxyl titration technique, the poly(alkylene carbonate)polyol is reacted with excess phthalic anhydride in pyridine. The unreacted anhydride is determined by titration with 0.5N NaOH. For purposes of this invention $\overline{M}_n$ refers to number average molecular weight, $\overline{M}_w$ refers to weight average molecular weight, Peak refers to molecular weight at the peak of the molecular weight curve, PDI refers to poly dispersity index and is equal to $\overline{M}_w/\overline{M}_n$. Brookfield viscosity is determined using a Brookfield LV viscometer equipped with a No. 4 spindle.

EXAMPLE 1

A high molecular weight ($\overline{M}_n$ of 2889) poly(ethylene carbonate)polyol (15.85 g) having 29.3 wt% $CO_2$, is combined with tetraethylene glycol (10.04 g) in a 3-necked, 50 ml flask equipped with stirrer, thermometer, condenser and maintained under a $N_2$ atmosphere. The flask is heated to 175° C., and maintained at that temperature. A sample is removed as soon as 175° C. is reached and a second sample is removed after 30 minutes at 175° C. A catalyst is then added (1 wt % titanium isopropoxide) and samples are removed after 15 minutes, 30 minutes and 45 minutes from the time of catalyst addition.

The progress of the transesterification is followed by size exclusion chromatography (SEC). Results are tabulated below:

| Sample Number | Conditions | Molecular Wt. Data | | | |
|---|---|---|---|---|---|
| | | Peak | $\overline{M}_n$ | $\overline{M}_w$ | PDI |
| 0 | starting materials | 6219 | 2889 | 4663 | 1.61 |
| 1 | heated to 175°, no. cat. | 228 | 508 | 3485 | 6.85 |
| 2 | 30 min at 175°, no. cat. | 207 | 519 | 2687 | 5.17 |
| 3 | +15 min at 175° cat. | 841 | 517 | 848 | 1.63 |
| 4 | 30 min at 175°, cat. | 841 | 543 | 878 | 1.61 |
| 5 | 45 min at 175°, cat. | 841 | 506 | 838 | 1.65 |

This data shows that some reaction has occurred after 30 minutes of 175° C. without catalyst, but reaction is complete in less than 15 minutes after catalyst addition. No further change occurs after 15 minutes in the presence of the catalyst. The product is 17.5 wt% $CO_2$. Dilution effects alone lead to a calculated wt.% $CO_2$ of 17.9 indicating essentially no loss of $CO_2$ content.

$$\frac{15.85 \ (0.293)}{15.85 + 10.04} \times 100 = 17.9$$

This example shows that tetraethylene glycol can be incorporated into the backbone of a poly(alkylene carbonate)polyol.

EXAMPLE 2

The same poly(ethylene carbonate)polyol used in Example 1 above (16.02 g) and P-400 (10.19 g, a poly(propylene glycol) with a $\overline{M}_n$ of 400) are combined in the same equipment used in Example 1 above. The flask is heated to 175° C. and maintained at that temperature. A sample is removed as soon as 175° C. is reached and a second sample is removed after 30 minutes at 175° C. A catalyst is then added (1 wt. % titanium isopropoxide) and samples are removed after 15 minutes and 30 minutes from the time of catalyst addition. 25.5 g of product is formed.

The progress of the transesterification is followed by SEC. Results are tabulated below:

| Sample Number | Conditions | Molecular Wt. Data | | | |
|---|---|---|---|---|---|
| | | Peak | $\overline{M}_n$ | $\overline{M}_w$ | PDI |
| 0 | starting materials | 6219 | 2889 | 4663 | 1.61 |
| 1 | heated to 175° | 394 | 752 | 2687 | 3.57 |
| 2 | 30 min at 175°, no. cat. | 1502 | 803 | 1549 | 1.92 |
| 3 | 15 min at 175° cat. | 1151 | 705 | 1268 | 1.79 |
| 4 | 30 min at 175°, cat. | 1151 | 728 | 1261 | 1.73 |

This data shows that appreciable reaction has occurred after 30 minutes at 175° C. without catalyst. Reaction is complete in less than 15 minutes after catalyst addition. The two starting polyahls are immiscible at ambient temperature and at 175°. After 30 minutes at 175° C. the reaction has progressed to the point were only one phase (liquid) is present. The final product is one phase at ambient temperature.

The $CO_2$ content cannot be accurately determined due to the poly(propylene glycol)blocks. However, the lack of gas evolution observed during reaction and the product weight after reaction indicate very litle, if any, $CO_2$ loss.

EXAMPLE 3

The same poly(ethylene carbonate)polyol used in Example 1 above (15.71 g), poly(propylene carbonate)polyol (10.0 g, made from a propylene carbonate: diethylene glycol molar ratio of 10:1 are combined in the same apparatus is used as in Example 1 above. A low level of residual catalyst (0.1% sodium stannate trihydrate) is present. The flask is heated and the first sample removed at 100° C. Heating is continued to 175° C. and a second sample is removed. Two additional samples are removed after 15 minutes at 175° C. and after 30 minutes at 175° C.

The progress of the transesterification is followed by SEC. Results are tabulated below:

| Sample Number | Conditions | Molecular Wt. Data | | | |
|---|---|---|---|---|---|
| | | Peak | $\overline{M}_n$ | $\overline{M}_w$ | PDI |
| 0 | starting materials | 6219 | 2889 | 4663 | 1.61 |
| 1 | heated to 100° | 5035 | 673 | 3023 | 4.49 |
| 2 | heated to 175° | 1641 | 637 | 1419 | 2.22 |
| 3 | 15 min at 175° | 1151 | 594 | 1199 | 2.01 |
| 4 | 30 min at 175° | 1258 | 641 | 1416 | 2.20 |

Reaction is complete within 15 minutes at 175° C. This example shows that the modifier can be a different poly(alkylene carbonate)polyahl. Transesterification forms a new poly(alkylene carbonate)polyahl containing the elements of the two reactants.

EXAMPLE 4

A high molecular weight ($\overline{M}_n$ of 2942) poly(ethylene carbonate)polyol (16.1 g; 0.099 mol carbonate) is combined with P-1200 [a poly(propylene glycol) with a $\overline{M}_n$ of 1200, 10.0 g; 0.0167 mol OH] in the same equipment as used in Example 1 above. Sodium stannate trihydrate (0.5 wt. %) is added. This mixture (two phases) gives a molar ratio of carbonate in the poly(ethylene carbonate)polyol to hydroxyl in the P-1200 of 5.9. The flask is heated to 175° and a sample removed. Additional samples are taken at 15 min, 45 min, 75 min and 105 min.

The progress of the transesterification is followed by SEC. Results are tabulated below:

| Sample Number | Conditions | Molecular Wt. Data | | | |
|---|---|---|---|---|---|
| | | Peak | $\overline{M}_n$ | $\overline{M}_w$ | PDI |
| 0 | starting materials | 5132 | 2942 | 4492 | 1.52 |
| 1 | heated to 175° | 1053 | 1055 | 2525 | 2.39 |
| 2 | 15 min at 175° | 1151 | 1099 | 2551 | 2.32 |
| 3 | 45 min at 175° | 2771 | 1119 | 2835 | 2.53 |
| 4 | 75 min at 175°, cat. | 3021 | 1247 | 2966 | 2.37 |
| 5 | 105 min at 175°, cat. | 3031 | 1116 | 2969 | 2.55 |

The reaction is complete within 75 minutes at 175° C. The product is a single phase, liquid material containing very little P-1200. The majority of the P-1200 has been chemically incorporated into the backbone of the polymer.

EXAMPLE 5

The same poly(ethylene carbonate)polyol (16.0 g) used in Example 4 above is combined with

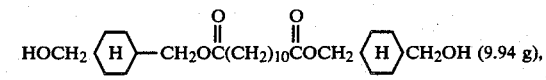 (9.94 g), a polyester polyol called K-Flex 188-50 manufactured by King Industries. The mixture (two phases) given a molar ratio of carbonate in the poly(alkylene carbonate)polyahl to hydroxyl in the K-Flex of 2.2 A catalyst is added (0.13 g, 0.5 wt.% sodium stannate trihydrate). The same apparatus is used as in Example 1 above. The flask is heated to 110° C. and a sample is removed. Heating is continued to 175° C. and a second sample is taken. Additional samples are taken after 15 min, 30 min, 45 min, and 75 min at 175° C.

The progress of the reaction is followed by SEC. Results are tabulated below:

| Sample Number | Conditions | Molecular Wt. Data | | | |
|---|---|---|---|---|---|
| | | Peak | $\overline{M}_n$ | $\overline{M}_w$ | PDI |
| 0 | starting materials | 5132 | 2942 | 4492 | 1.52 |

-continued

| Sample Number | Conditions | Peak | $\overline{M}_n$ | $\overline{M}_w$ | PDI |
|---|---|---|---|---|---|
| 1 | heated to 110° C. | 394 | 716 | 2273 | 3.17 |
| 2 | heated to 175°. | 1502 | 797 | 1746 | 2.19 |
| 3 | +15 min at 175° C. | 1791 | 787 | 1811 | 2.30 |
| 4 | 30 min at 175° C. | 1641 | 745 | 1706 | 2.28 |
| 5 | 75 min at 175° C. | 1641 | 847 | 1750 | 2.06 |
| K-Flex | starting material | 360 | 464 | 592 | 1.27 |

The reaction is complete within 15 minutes at 175° C. The product is a single phase, liquid material containing very little free K-Flex. This example shows that a polyester polyol can be chemically incorporated into the backbone of a poly(ethylene carbonate)polyol.

EXAMPLE 6

The same high molecular weight poly(ethylene carbonate)polyol (16.10 g; made from ethylene carbonate) used in Example 4 above and a low molecular weight ($\overline{M}_n$ of 354) poly(ethylene carbonate)polyol (9.99 g; made from ethylene oxide and $CO_2$ at 175° C. using glycerine as initiator and sodium stannate trihydrate as catalyst) are placed in the same apparatus as used in Example 1 above. Sodium stannate trihydrate (0.13 g, 0.5 wt. %) is added. The two polyols are miscible under ambient conditions. The flask is heated to 175° C. and sample was removed. Additional samples are taken at 15 min and 30 min at 175° C.

The progress of the reaction is followed by SEC. Results are tabulated below:

| Sample Number | Conditions | Peak | $\overline{M}_n$ | $\overline{M}_w$ | PDI |
|---|---|---|---|---|---|
| C$_1$* | EO poly(ethylene carbonate) polyol | 375 | 354 | 461 | 1.81 |
| C$_2$* | EC poly(ethylene carbonate) polyol | 5132 | 2942 | 4492 | 1.52 |
| 1 | ambient temp. | 4628 | 550 | 2573 | 4.67 |
| 2 | heated to 175° | 1151 | 557 | 1356 | 2.43 |
| 3 | 15 min at 175° | 1053 | 466 | 1313 | 2.81 |
| 4 | 30 min at 175° | 1053 | 586 | 1332 | 2.27 |

*Not an example of the invention.

The reaction is complete within 15 minutes at 175° C. This example shows that the modifier can be a different poly(ethylene carbonate)polyol and that the poly(ethylene carbonate)polyols can be prepared in different ways. After transesterification, the product contains the elements of the two reactants.

EXAMPLE 7

Two different poly(ethylene carbonate)polyols, a poly(ethylene carbonate)polyol based on glycerine, ethylene oxide, and carbon dioxide used in Example 6 above (13.16 g) and a higher molecular weight ($M_n$ of 1269) poly(ethylene carbonate)polyol based on glycerine, ethylene oxide, and carbon dioxide (13.68 g) are combined in the same apparatus used in Example 1 above. Sodium stannate trihydrate (0.13 g, 0.5 wt.%) is added as catalyst. The flask is heated to 175° C. and a sample was removed. Additional samples are taken at 15 min and 30 min at 175° C.

The progress of the reaction is followed by SEC. Results are tabulated below:

| Sample Number | Conditions | Peak | $\overline{M}_n$ | $\overline{M}_w$ | PDI |
|---|---|---|---|---|---|
| C$_1$* | starting poly (ethylene carbonate) polyol | 375 | 354 | 641 | 1.81 |
| C$_2$* | starting poly (ethylene carbonate) polyol | 2770 | 1269 | 3292 | 2.59 |
| 1 | ambient temp. | 616 | 446 | 1529 | 3.43 |
| 2 | heated to 175° | 806 | 439 | 888 | 2.02 |
| 3 | 15 min at 175° | 737 | 460 | 884 | 1.91 |
| 4 | 30 min at 175° | 806 | 497 | 916 | 1.84 |

*Not an example of the invention.

The reaction is complete in less than 15 minutes.

EXAMPLE 8

The same poly(ethylene carbonate)polyol (25.0 g, 0.153 mol carbonate) used in Example 4 above is combined with P-400 (7.46 g, 0.0382 mol hydroxyl) and sodium stannate trihydrate (0.16 g, 0.5 wt%) in the same apparatus used in Example 1 above. The flask is heated at 135° C. and samples are removed at various times for SEC analysis.

The progress of the reaction is followed by SEC. The results are tabulated below:

| Sample Number | Conditions | Peak | $\overline{M}_n$ | $\overline{M}_w$ | PDI |
|---|---|---|---|---|---|
| C$_1$* | Starting poly(ethylene carbonate) polyol | 5132 | 2942 | 4492 | 1.52 |
| 1 | 0.5 Hr. | 3697 | 974 | 3161 | 3.24 |
| 2 | 1.0 Hr. | 2727 | 964 | 2650 | 2.74 |
| 3 | 1.5 Hr. | 2461 | 960 | 2390 | 2.48 |
| 4 | 2.0 Hr. | 2221 | 951 | 2287 | 2.40 |
| 5 | 2.5 Hr. | 2221 | 942 | 2291 | 2.43 |
| 6 | 3.0 Hr. | 2221 | 958 | 2287 | 2.38 |

*Not an example of the invention.

The reaction appears complete in about 2 hours. There is 100% retention of $CO_2$ content (by NMR) during the reaction. This example shows that lower reaction temperatures can be used but that longer reaction times are required.

EXAMPLE 9

A poly(ethylene carbonate)polyol ($\overline{M}_n$ of 1071; 21.28 g 0.133 mol carbonate) is combined with Jeffamine® D-400 (13.34 g, 0.0667 mol $NH_2$) and sodium stannate trihydrate (0.35 g, 1.0 wt %) in the same apparatus used in Example 1 above. (Jeffamine® D-400 is a 400 mol wt poly(propylene glycol) in which the hydroxyl groups have been converted to amino groups.) This mixture (two phases) gives a molar ratio of carbonate:amine of 2.0. The flask is heated to 175° C. and samples are removed at various times for SEC analysis.

The progress of the reaction is followed by SEC. Results are tabulated below:

| Sample Number | Conditions | Peak | $\overline{M}_n$ | $\overline{M}_w$ | PDI |
|---|---|---|---|---|---|
| D-400 | starting material | 307 | 257 | 613 | 2.38 |
| 1 | heated to 175° | 3343 | 589 | 2376 | 4.03 |
| 2 | ½ Hr. at 175° | 368 | 521 | 1208 | 2.31 |
| 3 | 1 Hr. at 175° | 368 | 442 | 832 | 1.87 |
| 4 | 1½ Hr. at 175° | 795 | 495 | 875 | 1.76 |

Reaction appears complete within 90 minute at 175° C. There is a 76% retention of $CO_2$ content (by NMR) during reaction. The product is a single phase, liquid material containing little free D-400 and 12.8 wt % $CO_2$ by NMR analysis. This example shows that a polyamine can function as the modifier to produce a modified poly(ethylene carbonate)polyahl which contains both hydroxyl and amino end groups.

EXAMPLE 10

The same poly(ethylene carbonate)polyol (25.92 g, 0.159 mol carbonate) used as in Example 4 above is combined with triethylene tetramine (2.90 g, 0.0397 mol $NH_2$) and sodium stannate trihydrate (1.0 wt %) in the same apparatus used in Example 1 above. This mixture gives a molar ration of carbonate:amine of 4.0. The flask is heated to 175° C. and samples are removed at various times for SEC analysis.

The progress of the reaction is followed by SEC. Results are tabulated below:

| Sample Number | Conditions | Peak | $\overline{M}_n$ | $\overline{M}_w$ | PDI |
|---|---|---|---|---|---|
| $C_1$* | starting materials | 5256 | 1393 | 4490 | 3.22 |
| 1 | heated to 175° C. | 1729 | 772 | 1750 | 2.26 |
| 2 | 30 min at 175° C. | 981 | 517 | 1127 | 2.18 |
| 3 | 1 Hr. at 175° C. | 877 | 473 | 980 | 2.07 |
| 4 | 1½ Hr. at 175° C. | 877 | 452 | 914 | 2.02 |

*Not an example of the invention.

The reaction appears complete between 30 and 60 minutes at 175° C. The product is a single phase, liquid material containing very little free triethylene tetramine and containing 19.89% $CO_2$ by NMR analysis. This represents 83% $CO_2$ retention after reactions under the conditions employed.

EXAMPLE 11

The same poly(ethylene carbonate)polyol (24.30 g; 0.149 mol carbonate) used in Example 4 above is combined with adipic acid (4.00 g; 0.055 mol-$CO_2H$) and sodium stannate trihydrate (0.28 g, 1.0 wt %) in the same apparatus used in Example 1 above. This mixture gives a molar ratio of carbonate:carboxylic acid of 2.7. The flask is heated to 175° C. and samples are removed at various times for SEC analysis.

The progress of the reaction is followed by SEC. Results are tabulated below:

| Sample | Conditions | Peak | $\overline{M}_n$ | $\overline{M}_w$ | PDI |
|---|---|---|---|---|---|
| $C_1$* | starting materials | 5132 | 2942 | 4492 | 1.52 |
| 1 | heated to 175° C. | 182 | 769 | 3985 | 5.18 |
| 2 | ½ Hr. at 175° C. | 4723 | 917 | 3721 | 4.05 |
| 3 | 1 Hr. at 175° C. | 3800 | 976 | 3358 | 3.44 |
| 4 | 1½ Hr. at 175° C. | 3403 | 1028 | 3115 | 3.02 |
| 5 | 2 Hr. at 175° C. | 3044 | 1011 | 2785 | 2.75 |
| 6 | 2½ Hr. at 175° C. | 2721 | 1002 | 2796 | 2.79 |
| 7 | 3 Hr. at 175° C. | 2721 | 1002 | 2691 | 2.63 |
| 8 | 3½ Hr. 175° C. | 2721 | 1040 | 2629 | 2.58 |
| 9 | 4 Hr. at 175° C. | 2721 | 960 | 2496 | 2.59 |

*Not an example of the invention.

Reaction appears complete at 2-2.5 hours. There is essentially no loss of $CO_2$ content (by NMR) during reaction. The majority of the adipic acid has been chemically incorporated into the backbone of the polymer. This example shows that a dicarboxylic acid can function as a modifier to produce a modified poly(ethylene carbonate)polyahl.

EXAMPLE 12

The same poly(ethylene carbonate)polyol (23.0 g, 0.144 mol carbonate) used in Example 9 above is combined with bisphenol A (2.74 g, 0.024 mol OH) and sodium stannate trihydrate (0.026 g, 1.0 wt %) in the same apparatus used in Example 1 above. This mixture gives a molar ratio of carbonate:phenolic of 6.0. The flask is heated at 175 C. and samples are removed at various times for SEC analysis. A similar experiment carried out using a molar ratio of carbonate:phenolic of 2.0.

The progress of the reaction is followed by SEC. Results are tabulated in A and B below:

| Sample | Conditions | Peak | $\overline{M}_n$ | $\overline{M}_w$ | PDI |
|---|---|---|---|---|---|
| A. Carbonate: Phenolic = 6 | | | | | |
| 0 | starting material | 4086 | 1071 | 3623 | 3.38 |
| 1 | heated to 175° C. | 239 | 593 | 2167 | 3.65 |
| 2 | ½ Hr. at 175° C. | 239 | 611 | 1842 | 3.01 |
| 3 | 1 Hr. at 175° C. | 239 | 658 | 1852 | 2.81 |
| 4 | 1½ Hr. at 175° C. | 239 | 657 | 1798 | 2.73 |
| B. Carbonate: Phenolic = 2 | | | | | |
| 1 | heated to 175° C. | 239 | 399 | 1370 | 3.43 |
| 2 | 30 Min at 175° C. | 259 | 447 | 1148 | 2.56 |
| 3 | 60 Min at 175° C. | 259 | 446 | 1098 | 2.45 |
| 4 | 90 Min at 175° C. | 259 | 436 | 1076 | 2.45 |
| 5 | 120 Min at 175° C. | 259 | 448 | 1077 | 2.40 |

Equilibrium appears to have been established within 30 minutes at 175° C. There is a decrease in molecular weight of the poly(ethylene carbonate)polyol and a decrease in peak height of the bisphenol A. There is 100% retention of $CO_2$ content (by NMR) during reaction. This example shows that a poly phenolic material such as bisphenol-A can function as a modifier. However, only a portion of this bisphenol-A reacts.

EXAMPLE 13

A. CARBONATE:OH=2.0

The same poly(ethylene carbonate)polyol (3.64 g, 0.0223 mol carbonate) used in Example 4 above is combined with E-4500, a poly(ethylene glycol) with a molecular weight of 4500 (24.00 g, 0.011 mol OH) and sodium stannate trihydrate (0.15 g, 0.5 wt %) in the same apparatus used in Example 1 above. The flask is heated at 175° C. and samples are removed at various times for SEC analysis. The reaction is complete in 1 to 1½ hours.

B. CARBONATE:OH=4.0

Additional poly(ethylene carbonate)polyol (3.64 g, 0.0223 mol) is added. The flask is heated to 175° C. and samples are removed at various times for SEC analysis. The reaction is complete within 15 minutes.

C. CARBONATE:OH=8.0

Additional poly(ethylene carbonate)polyol (7.28 g, 0.0446 mol) is added and reaction continued. The reaction is complete within 15 minutes.

D. CARBONATE:OH=16.0

Additional poly(ethylene carbonate)polyol (14.56 g, 0.0892 mol) is added and the reaction continued. The reaction is complete within 15 minutes.

Molecular analysis by SEC shows the following multiple, complex peaks:

(1) Mol wt<4500; contains no E-4500

(2) Mol wt 6000 to 8000; probably contains one E-4500 per molecule (3) Mol wt 12,000 to 13,200; probably contains two E-4500 per molecule All peak molecular weights increase as the carbonate hydroxyl ratio increases; lower hydroxyl concentration translates to higher molecular weight at equilibrium.

EXAMPLE 14

A. A high molecular weight ($\overline{M}_n$ of 2942) poly(ethylene carbonate)polyol (27.88 gm; 0.171 mol carbonate), N-methylbis(2-hydroxyethyl)amine (2.54 gm, 0.0427 mol OH) and sodium stannate trihydrate (1.0 wt %) are combined and heated to 175° C. This mixture gives a carbonate:hydroxyl molar ratio of 4. Samples are analyzed by SEC after heating to 175° C. and after 30 minutes at 175° C. The product is dark brown. Gas is evolved during reaction. Conditions are too severe; backbone degradation has occurred. The results are tabulated in A below.

B. The same poly(ethylene carbonate)polyol and N-methylbis(2-hydroxyethyl)amine are combined and heated to 135° C. (carbonate:OH=4; no catalyst). Samples are analyzed by SEC at selected times. The product is dark yellow. Some degradation has occurred but it is less severe than in (A) above.

C. The same poly(ethylene carbonate)polyol and N-methylbis(2-hydroxyethyl)amine are combined as in (A) above and heated to 80° C. (carbonate:OH=4; no catalyst). Samples are analyzed by SEC at selected times. The product is pale yellow. The reaction appears to be complete in about 4 hours.

| Sample Number | Conditions | Molecular Wt. Data | | | |
|---|---|---|---|---|---|
| | | Peak | $\overline{M}_n$ | $\overline{M}_w$ | PDI |
| A. 175° C.; 1.0 Wt % Sodium Stannate Trihydrate | | | | | |
| C₁* | starting poly (ethylene carbonate) polyol | 5132 | 2942 | 4492 | 1.52 |
| 1 | heated to 175° C. | 1377 | 678 | 1395 | 2.05 |
| 2 | 30 Min at 175° C. | 1098 | 578 | 1125 | 1.94 |
| B. 135° C.; No Catalyst | | | | | |
| 1 | heated to 135° C. | 2431 | 795 | 2363 | 2.97 |
| 2 | 0.5 Hr at 135° C. | 1543 | 738 | 1672 | 2.26 |
| 3 | 1 Hr at 135° C. | 1543 | 726 | 1593 | 2.19 |
| 4 | 2 Hr at 135° C. | 1377 | 686 | 1475 | 2.14 |
| 5 | 3 Hr at 135° C. | 1377 | 671 | 1430 | 2.13 |
| C. 80° C.; No Catalyst | | | | | |
| 1 | heated to 80° C. | 3800 | 861 | 3682 | 4.27 |
| 2 | 0.5 Hr at 80° C. | 3403 | 818 | 2980 | 3.64 |
| 3 | 1 Hr at 80° C. | 2721 | 817 | 2495 | 3.05 |
| 4 | 1.5 Hr at 80° C. | 2431 | 823 | 2261 | 2.74 |
| 5 | 2 Hr at 80° C. | 1938 | 772 | 1974 | 2.55 |
| 6 | 3 Hr at 80° C. | 1938 | 790 | 1874 | 2.37 |
| 7 | 4 Hr at 80° C. | 1729 | 773 | 1977 | 2.55 |
| 8 | 5 Hr at 80° C. | 1729 | 776 | 1735 | 2.23 |
| 9 | 7 Hr at 80° C. | 1729 | 785 | 1788 | 2.27 |

The peak molecular weight vs time for each of the three reactions of a poly(alkylene carbonate)polyol with N-methylbis(2-hydroxyethyl)amine indicates that the final molecular weight of each system is different. The lower molecular weight with more severe conditions is a consequence of more degradation of the polymer backbone and leads to a more highly colored product. The tertiary amine center acts as its own catalyst and a favorable product is obtained after 4 hours at 80° C. without any additional catalyst.

EXAMPLE 15

A high molecular weight ($\overline{M}_n$ of 2942) poly(ethylene carbonate)polyol (28.60 gm; 0.177 mol carbonate), bis(2-hyroxyethyl ether) of bisphenol A (8.55 gm; 0.0541 mol OH) and sodium stannate trihydrate (0.5 wt %) are combined and heated to 150° C. The mixture gives a molar carbonate:hydroxyl ratio of 3.3. Samples are analyzed by SEC. Transesterification is complete within 15 to 30 minutes at 150° C. The majority of the modifier is chemically incorporated into the polymer backbone.

| Sample Number | Conditions | Molecular Wt. | | | |
|---|---|---|---|---|---|
| | | Peak | $\overline{M}_n$ | $\overline{M}_w$ | PDI |
| C₁* | starting poly (ethylene carbonate) polyol | 5132 | 2942 | 4492 | 1.52 |
| 1 | heated to 110° C. | 283 | 615 | 2129 | 3.46 |
| 2 | heated to 150° C. | 1027 | 640 | 1136 | 1.77 |
| 3 | 15 Min at 150° C. | 767 | 542 | 889 | 1.64 |
| 4 | 30 Min at 150° C. | 767 | 546 | 924 | 1.69 |
| 5 | 45 Min at 150° C. | 697 | 502 | 816 | 1.62 |
| 6 | 60 Min at 150° C. | 767 | 516 | 837 | 1.62 |

*Not an example of the invention.

EXAMPLE 16

A high molecular weight ($\overline{M}_n$ of 3103) poly(ethylene carbonate)polyol (423.3 g) and 1,4-butanediol (47.03 g) are combined in a 500 ml, 3-necked reaction flask equipped with thermometer, stirrer, condenser and temperature controller. The reactor is heated to 175° C. and samples are removed at various times to follow the course of the transesterification.

| Sample Number | Conditions | Molecular Wt. | | | |
|---|---|---|---|---|---|
| | | Peak | $\overline{M}_n$ | $\overline{M}_w$ | PDI |
| C₁* | starting poly(ethylene carbonate) polyol | 6285 | 3103 | 6715 | 2.16 |
| 1 | heated at 175° C. | 1397 | 936 | 1653 | 1.77 |
| 2 | 30 min. at 175° C. | 1375 | 915 | 1563 | 1.71 |
| 3 | 60 min. at 175° C. | 1397 | 925 | 1576 | 1.71 |

*Not an example of the invention.

The reaction is complete on reaching 175° C. The product is a straw-colored viscous liquid containing 10.0 wt% 1,4-butanediol chemically incorporated into the backbone of a poly(ethylene carbonate)polyol. The Brookfield viscosity at 24° C. is 2350 cps.

This example shows that reaction rates can be rapid even in the absence of a catalyst.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all the features which would be considered as equivalents thereof by those skilled in the art to which this invention pertains.

What is claimed is:

1. A process for modifying a poly(alkylene carbonate)polyahl which comprises:

contacting the poly(alkylene carbonate)polyahl with at least one modifier including at least one active hydrogen moiety or a cyclic anhydride moiety selected from the group consisting of polyahls and cyclic anhydrides, containing two or more functional groups and reacting an active moiety of said poly(alkylene carbonate)polyahl and said reactive moiety of said modifier to form a modified poly(alkylene carbonate)polyahl wherein the modifier is chemically bonded to the poly(alkylene carbonate)polyahl; the reaction conditions and the proportion of the modifier to the polyahl being sufficient to provide a modified product weight of the poly(alkylene carbonate)polyahl.

2. The process of claim 1, wherein the contacting step is conducted at a temperature between about 80° C. and about 300° C.

3. The process of claim 1, wherein the poly(alkylene carbonate)polyahl is a random polymer which corresponds to the formula:

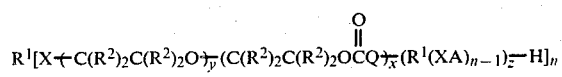

wherein
$R^1$ is separately in each occurrence an n-valent hydrocarbon radical or hydrocarbon radical which can contain one or more heteroatoms of O, N or S;
$R^2$ is separately in each occurrence hydrogen, halogen, a nitrogen group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;
X is separately in each occurrence S, O, NH,

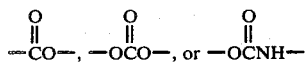

A is separately in each occurrence

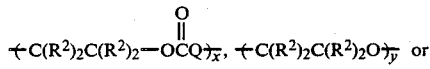

combinations thereof or a covalent bond;
Q is separately in each occurrence O, S or NH provided that all carbonate moieties are internal because terminal carbonate moieties are unstable and form OH moieties by the elimination of $CO_2$;
n is separately in each occurrence an integer of from 1 to 25;
x is separately in each occurrence an integer of from 1 to 40;
y is separately in eafh occurrence an integer of from 1 to 120; and
z is separately in each occurrence an integer of from 0 to 5.

4. The process of claim 3 wherein
x is oxygen, x is separately in each occurrence an interger from 2 to 10,
y is separately in each occurrence an interger from 5 to 15, and
z is an interger from 0 to 2, provided that the ratio of y to x is from 1:1 to 3:1.

5. The process of claim 4 wherein $R^1$ is aliphatic or cycloaliphatic hydrocarbon containing one or more oxygen, nitrogen, or sulfur moieties; $R^2$ is hydrogen, $C_{1-20}$ alkyl, $C_{1-20}$ haloalkyl, $C_{1-20}$ alkenyl or phenyl; X is S, O, or NH; and n is an integer from 1 to 10.

6. The process of claim 5, wherein $R^1$ is an n valent alkane or cycloalkane, or an n valent alkane or cycloalkane containing one or more oxygen, nitrogen, or sulfur moieties; $R^2$ is hydrogen, methyl or ethyl; X is O; and n is an integer from 1 to 5.

7. The process of claim 6 wherein $R^1$ is an n valent $C_{1-10}$ alkane or an n valent $C_{1-10}$ alkane substituted with one or more oxygen moieties; $R^2$ is hydrogen or methyl; and n is 1 or 2.

8. The process of claim 7 wherein $R^2$ is hydrogen.

9. The process of claim 1 wherein said modifier is an aliphatic polyahl.

10. The process of claim 1 wherein said modifier is a poly(propylene glycol).

11. The process of claim 1 wherein said modifier is a polyether polyol or a polyester polyol.

12. The process of claim 1 wherein said modifier is a poly(ethylene glycol).

13. The process of claim 1 wherein said modifier is triethylene glycol.

14. The process of claim 1 wherein said modifier is a poly(alkylene carbonate)polyahl.

15. The process of claim 1 wherein said modifier is tripropylene glycol or 1,6-hexanediol.

16. The process of claim 1 wherein said modifier is an aminated poly(propylene glycol).

17. The process of claim 1, wherein said modifier is an amine.

18. The process of claim 1, wherein said modifier is a poly(amine).

19. The process of claim 1, wherein said modifier is triethylene tetramine.

20. The process of claim 1, wherein said modifier is a cyclic anhydride.

21. The process of claim 1, wherein said modifier is succinic anhydride, phthalic anhydride or maleic anhydride.

22. The process of claim 1, wherein said modifier is a polyhydric alcohol.

23. The process of claim 1, wherein said modifier is poly(caprolactone)diol.

24. The process of claim 1, wherein said modifier is poly(1,2-butylene glycol).

25. The process of claim 1, wherein said poly(alkylene carbonate)polyahl to be modified is poly(ethylene carbonate)polyol.

26. The process of claim 1, wherein said modifier is a hydroxy-functional tertiary amine.

27. The process of claim 1, wherein said modifier is a phenolic.

28. The process of claim 1, wherein said contacting step is conducted in the presence of a catalyst selected from the group consisting of sodium stannate trihydrate, titanium isopropoxide and potassium carbonate.

29. The process of claim 1, wherein
said polyahl and said modifier are contacted at a temperature between about the transesterification temperature of the polyahl and the lowest decomposition temperature of the polyahl, the modifier or the modified polyahl or the temperature at which the modifier is volatilized.

30. The process of claim 1, wherein the proportion of the modifier to the polyahl is up to about stoichiometric.

31. The process of claim 1, further comprising
adding a catalytic amount of a catalyst for the reaction of an active moiety of the poly(alkylene carbonate)polyahl with a reactive moiety of the modifier; said catalyst selected from the group consisting of
alkali metal hydroxides,
alkaline earth metal hydroxides,
alkali metal carbonates,
alkaline earth metal carbonates,
ammonium hydroxide, and
ammonium carbonate.

32. The process of claim 1, wherein said contacting step is conducted in the presence of a catalyst selected from the group consisting of
metal hydroxides and metal alkoxides of a metal selected from the group consisting of lithium, sodium, potassium, rubidium, cesium, magnesium, calcium, strontium, barium, zinc, aluminum, titanium, cobalt, germanium, tin, lead, antimony, arsenic and cerium,
carbonates selected from the group consisting of alkali metal carbonates, alkaline earth metal carbonates, lead carbonate and ammonium carbonate,
borates selected from the group consisting of alkali metal borates, alkaline earth metal borates, zinc borate, lead borate, and ammonium borates,
hydrocarbyloxy titanates, lead silicate, lead arsenate, litharge,
oxides selected from the group consisting of antimony trioxide, zinc oxide, germanium dioxide, cerium trioxide, aluminum isopropoxide, and
salts of organic acids selected from the group consisting of magnesium, calcium, cerium, barium, zinc and titanium salts, and
stannates selected from the group consisting of alkali metal stannates, alkaline earth metal stannates, and ammonium stannates.

33. The process of claim 32, wherein the borate catalysts are selected from the group consisting of sodium meta-borate, sodium meta-borate tetrahydrate, sodium meta-borate dihydrate, sodium pentaborate pentahydrate, sodium tetraborate decahydrate, sodium tetraborate pentahydrate, diammonium tetraborate tetrahydrate, ammonium hydrogen tetraborate tetrahydrate, lithium ortho-dihydroborate, lithium meta-borate, lithium tetraborate, lithium pentaborate pentahydrate, potassium meta-borate, potassium tetraborate tetrahydrate, potassium tetraborate pentahydrate, potassium pentaborate tetrahydrate, magnesium meta-borate trihydrate, magnesium diborate, magnesium orthoborate, calcium meta-borate, calcium tetraborate, and strontium tetraborate tetrahydrate.

34. The process of claim 32, wherein the stannate catalysts are selected from the group consisting of sodium stannate trihydrate, potassium stannate trihydrate, potassium stannate monohydrate, barium stannate trihydrate, and magnesium stannate trihydrate.

35. The process of claim 31, wherein the catalyst is present in an amount between about 0.01% and 5% by weight based upon the reactants.

36. Th process of claim 35, wherein the catalyst is present in an amount between about 0.01% and about 1% by weight based on the reactants.

37. The process of claim 1, further comprising a solvent selected from the group consisting of inert organic solvents which are more volatile than the modified polyahl product.

* * * * *

UNITED STATES PATENT AND TRADEMARK OFFICE
CERTIFICATE OF CORRECTION

PATENT NO. : 4,686,274

DATED : August 11, 1987

INVENTOR(S) : Robert F. Harris, Midland, Mich.;
Donald G. Prier, Baton Rouge, La.

It is certified that error appears in the above-identified patent and that said Letters Patent is hereby corrected as shown below:

Column 1, line 37, the word "cases" should be -- case --.

Column 3, line 4, the word "board" should be -- broad --.

Column 4, line 48, the word "goup" should be -- group --.

Column 6, line 54, the word "gas" should be -- as --.

Column 9, line 21, the word "moeity" should be -- moiety --.

Column 10, line 63, the word "of" should be deleted and add the word -- at --.

Column 12, line 53, the word "given" should be -- gives --.

Column 15, line 1, the word "minute" should be -- minutes --.

Column 15, line 16, the word "ration" should be -- ratio --.

Column 19, line 32, the word "nitrogen" should be -- nitro --.

Column 19, line 42, the letter "Q" should be an -- O --.

Column 19, line 63, the word "eafh" should be -- each --.

Column 19, line 68, the letter "x" should be -- X --.

Column 20, line 1, the word "interger" should be -- integer --.

Column 20, line 3, the word "interger" should be -- integer --.

Column 20, line 5, the word "interger" should be -- integer --.

UNITED STATES PATENT AND TRADEMARK OFFICE
CERTIFICATE OF CORRECTION

PATENT NO. : 4,686,274

DATED : August 11, 1987

Page 2 of 2

INVENTOR(S) : Robert F. Harris, Midland, Mich.;
Donald G. Prier, Baton Rouge, La.

It is certified that error appears in the above-identified patent and that said Letters Patent is hereby corrected as shown below:

Column 22, line 33, the word "Th" should be -- The --.

On the title page before "Other Publications" insert

-- GB    898306    6/1962

Signed and Sealed this

Twenty-ninth Day of March, 1988

Attest:

DONALD J. QUIGG

Attesting Officer

Commissioner of Patents and Trademarks